Figure 1:
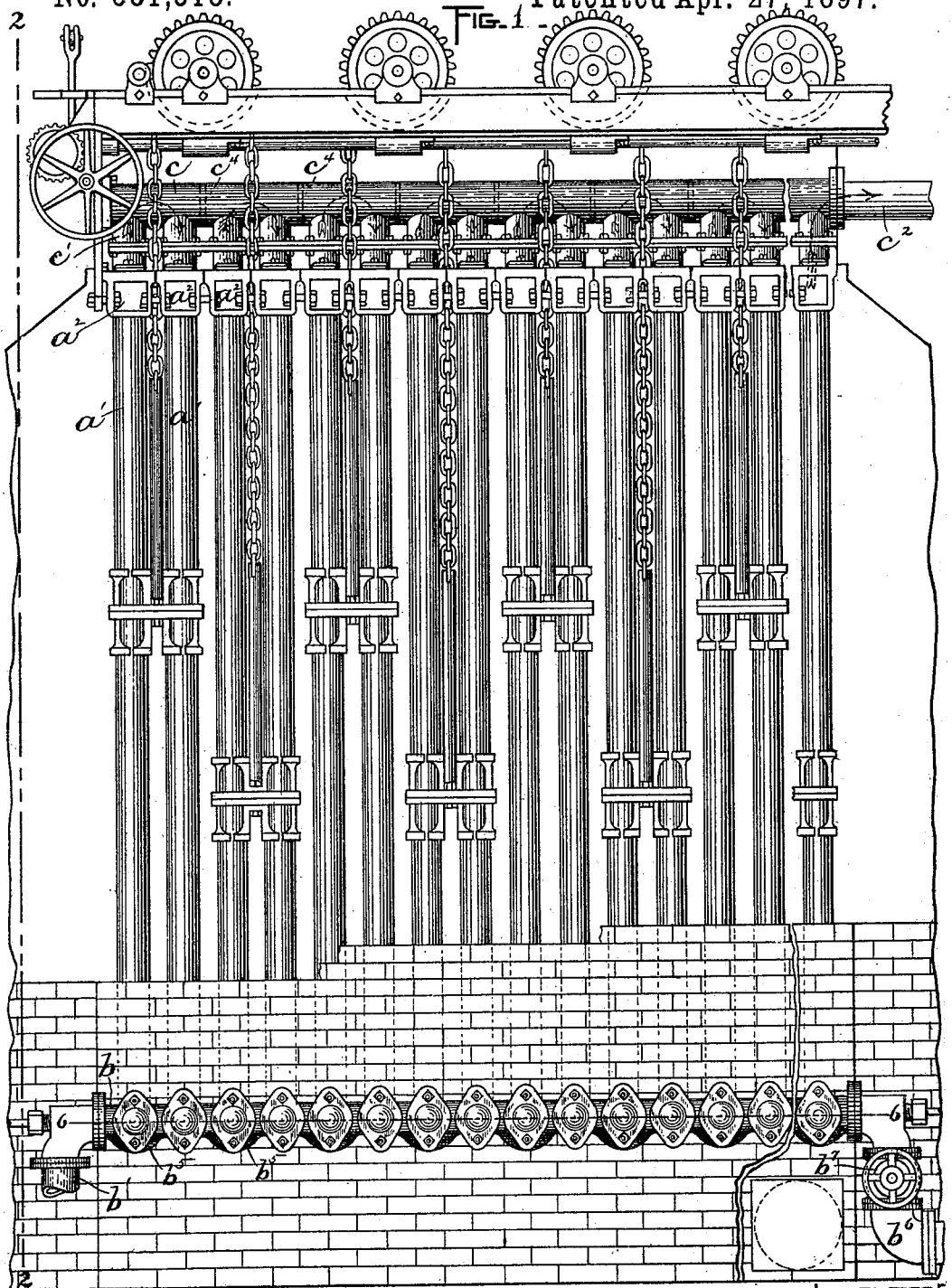

(No Model.) 5 Sheets—Sheet 1.

W. R. RONEY & W. W. CHURCHILL.
FUEL ECONOMIZER.

No. 581,518. Patented Apr. 27, 1897.

WITNESSES:
A. D. Harrison
A. T. Adams

INVENTORS
W. R. Roney
W. W. Churchill
by Knight Bros & Lundy Attys (No Model.) 5 Sheets—Sheet 2.
W. R. RONEY & W. W. CHURCHILL.
FUEL ECONOMIZER.
No. 581,518. Patented Apr. 27, 1897.
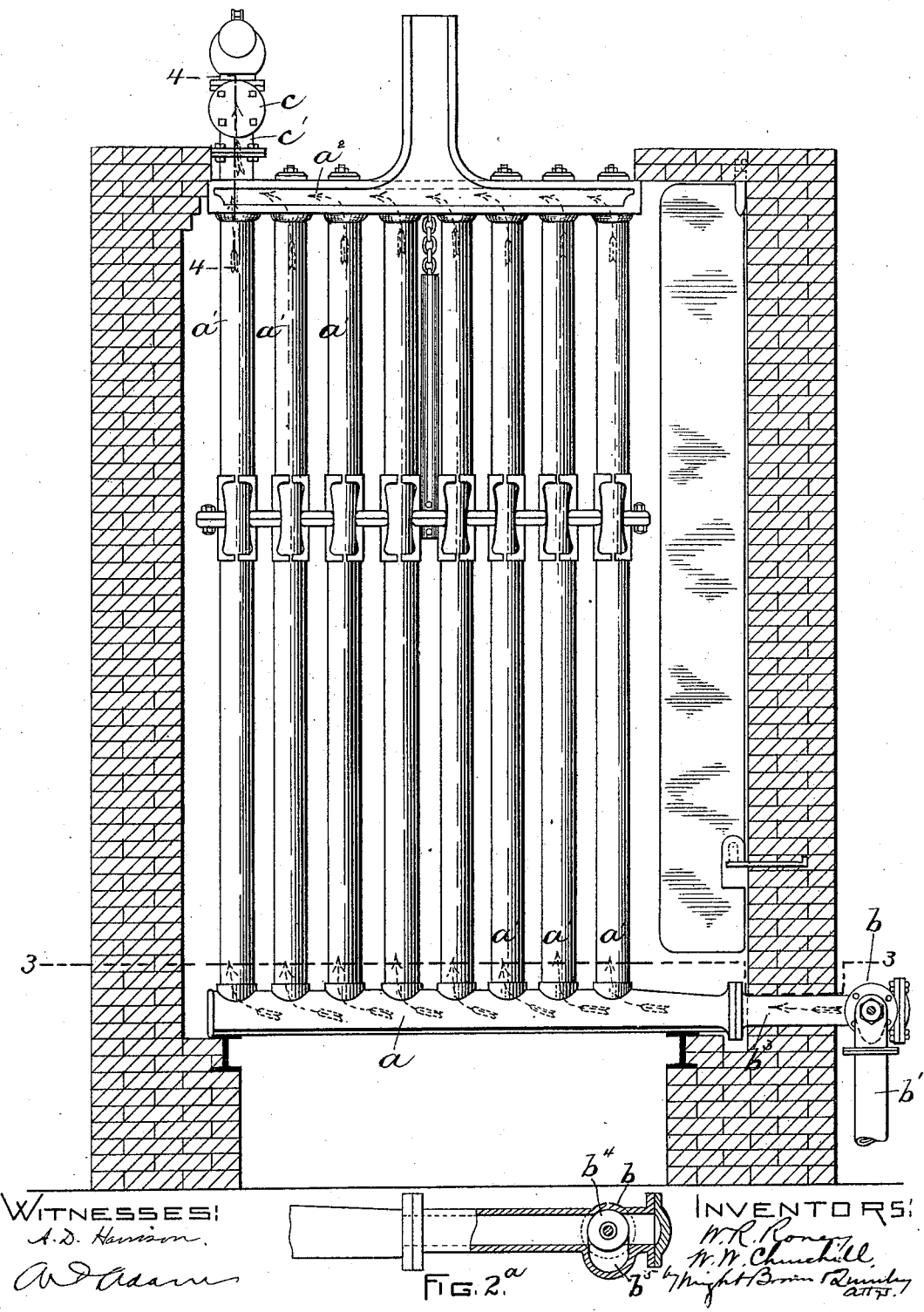
WITNESSES:
INVENTORS:

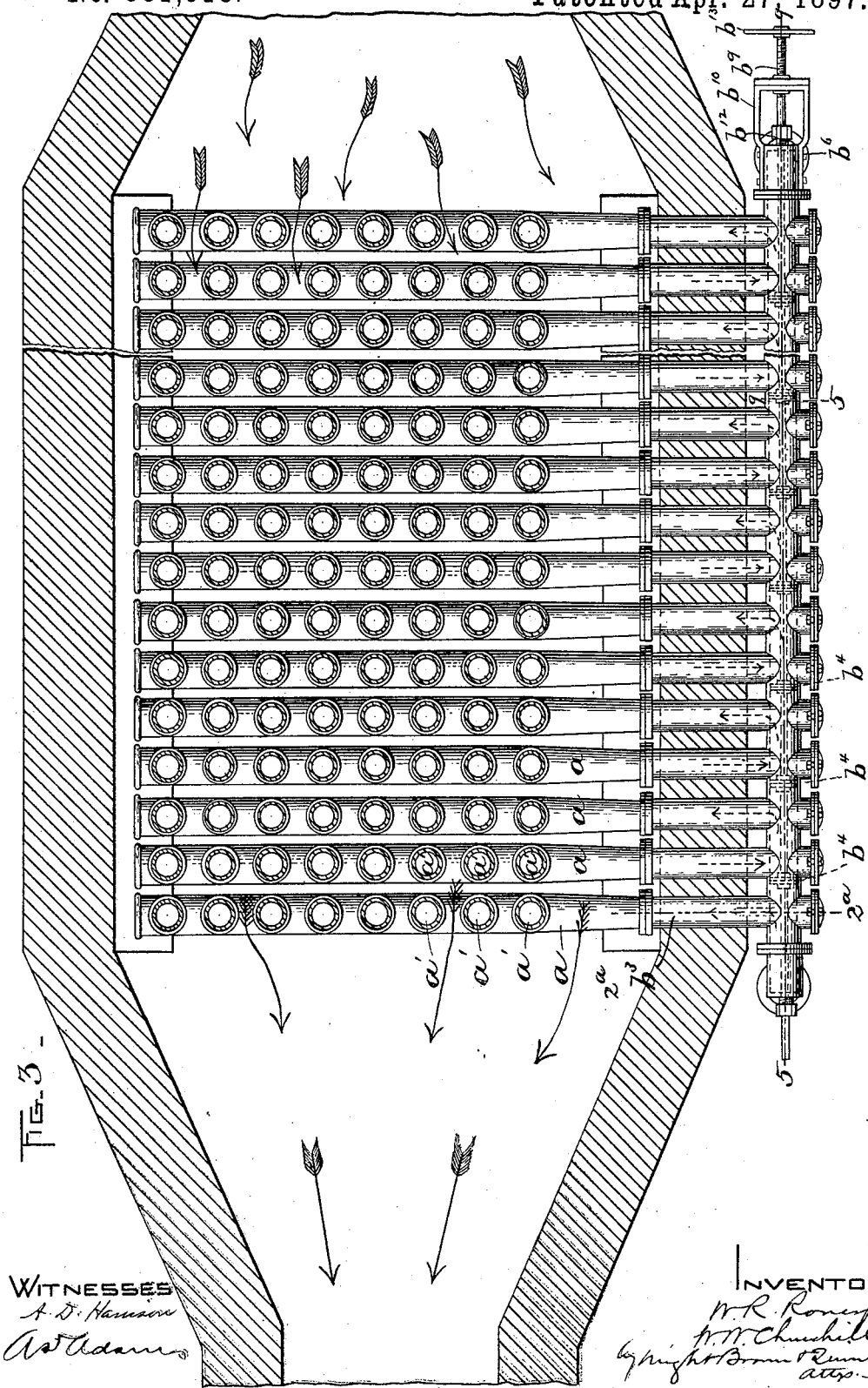

(No Model.) 5 Sheets—Sheet 4.
W. R. RONEY & W. W. CHURCHILL.
FUEL ECONOMIZER.
No. 581,518. Patented Apr. 27, 1897.
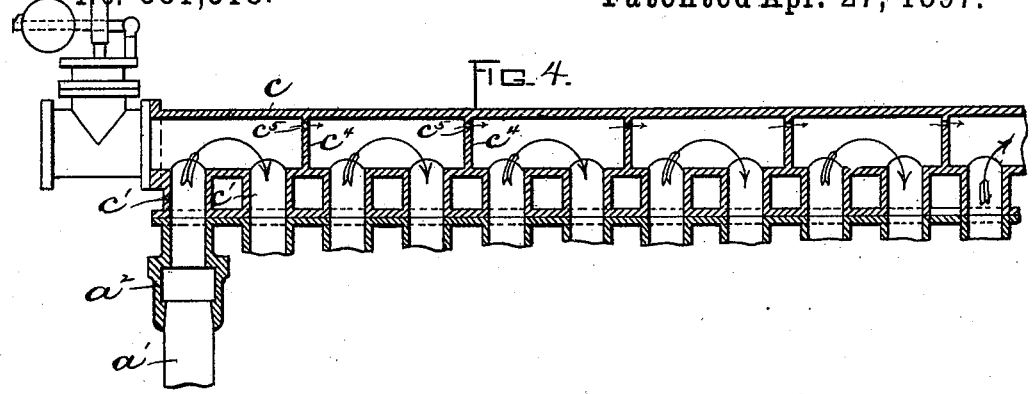
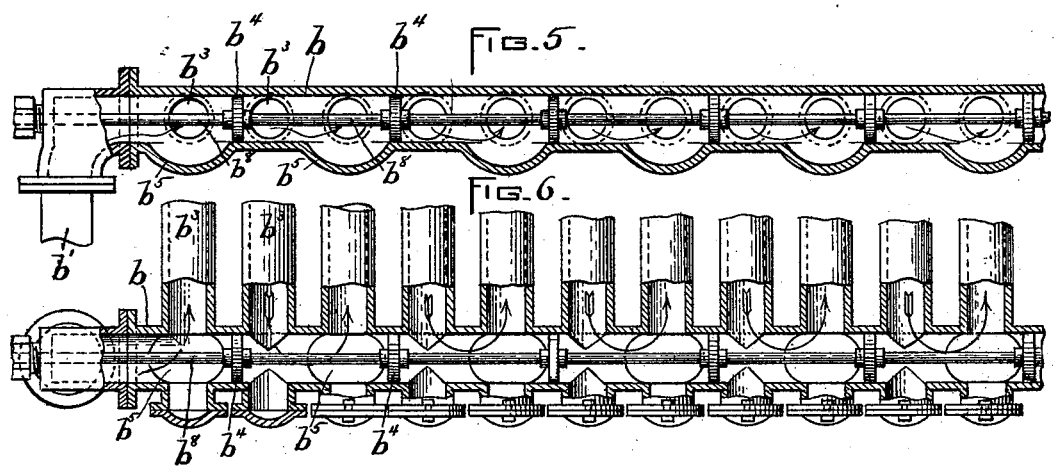
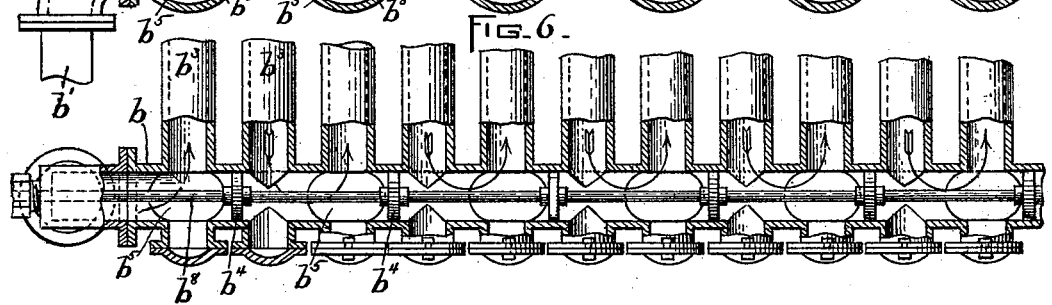
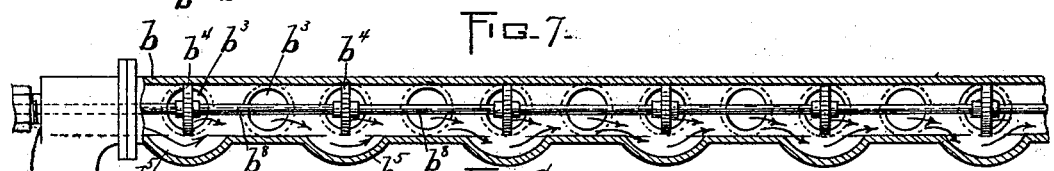
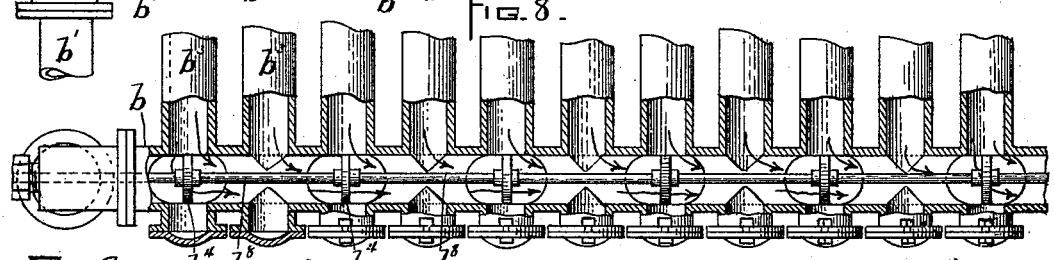
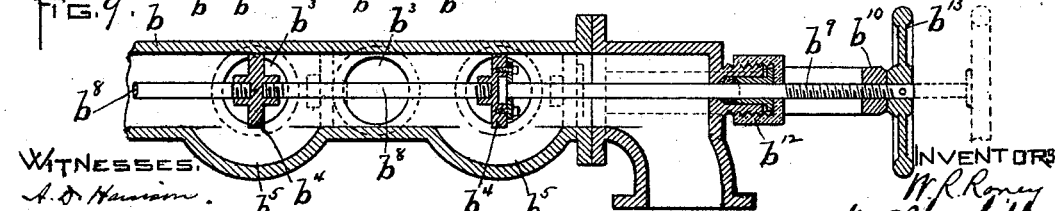
WITNESSES: INVENTORS

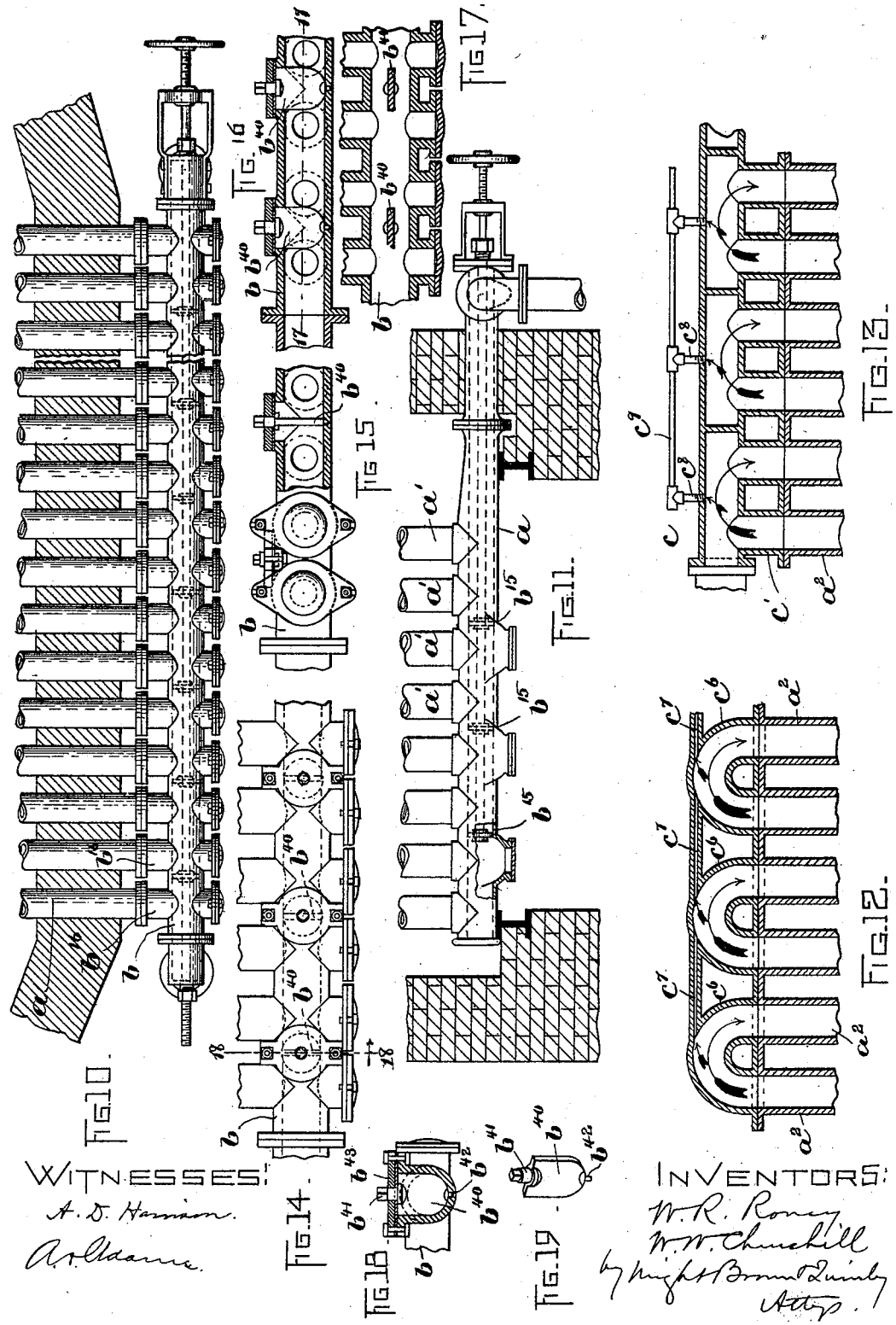

UNITED STATES PATENT OFFICE.

WILLIAM R. RONEY, OF BROOKLINE, MASSACHUSETTS, AND WILLIAM W. CHURCHILL, OF NEW YORK, N. Y., ASSIGNORS TO THE WESTINGHOUSE, CHURCH, KERR & COMPANY, OF NEW YORK, N. Y.

FUEL-ECONOMIZER.

SPECIFICATION forming part of Letters Patent No. 581,518, dated April 27, 1897.

Application filed April 18, 1896. Serial No. 588,180. (No model.)

*To all whom it may concern:*

Be it known that we, WILLIAM R. RONEY, of Brookline, in the county of Norfolk and State of Massachusetts, and WILLIAM W. CHURCHILL, of New York, in the county of New York and State of New York, have invented certain new and useful Improvements in Fuel-Economizers, of which the following is a specification.

This invention relates to that class of apparatus known as "fuel-economizers," in which a system of pipes is located in a flue which conducts the products of combustion from a boiler-furnace to a stack or chimney, and is constructed to conduct feed-water through the portion of the flue in which the apparatus is located, the feed-water being thus heated by the waste products of combustion and delivered to the boiler in a heated condition.

The invention relates particularly to a type of economizers comprised in said class in which the pipes are arranged to constitute a circulating system and to conduct the feed-water in a sinuous course through the space or area in which the heat is utilized.

The invention has for its object, first, to provide means for quickly and readily converting the circulating system of pipes or conduits into a non-circulating system through all the parts of which water and steam may be forced in practically one direction instead of passing in a sinuous course, to the end that the apparatus may be quickly and thoroughly cleansed by the back pressure of steam from the boiler, the same blowing out the water from the system of pipes and with it the sediment which may have accumulated therein.

The invention also has for its object to prevent obstruction of the circulation when the apparatus is in operation by air accumulating in the upper portion of the apparatus.

To these ends the invention consists in the several improvements hereinafter described and claimed.

Of the accompanying drawings, forming a part of this specification, Figure 1 represents a side elevation of a fuel-economizer embodying the invention, a portion of the flue casing or wall being broken away. Fig. 2 represents a section on line 2 2 of Fig. 1 and an elevation of the parts at the right of said line. Fig. $2^a$ represents a section on line $2^a$ $2^a$ of Fig. 3. Fig. 3 represents a section on line 3 3 of Fig. 2. Fig. 4 represents a section on line 4 4 of Fig. 2. Fig. 5 represents a section on line 5 5 of Fig. 3. Fig. 6 represents a section on line 6 6 of Fig. 1. Fig. 7 represents a view similar to Fig. 5, showing the adjustable partitions hereinafter referred to in their inoperative position. Fig. 8 represents a view similar to Fig. 6, showing the partitions in the position shown in Fig. 7. Fig. 9 represents a section on line 9 9 of Fig. 3. Figs. 10, 11, 12, and 13 represent modifications hereinafter referred to. Fig. 14 represents a top view of a portion of an adjustable circulation header or conduit having adjustable partitions which are independent of each other instead of being connected in a series. Fig. 15 represents a front view, partly in section, of the construction shown in Fig. 14. Fig. 16 represents a sectional view of the same construction, the partitions being adjusted to make the apparatus non-circulating. Fig. 17 represents a section on line 17 17, Fig. 16. Fig. 18 represents a section on line 18 18, Fig. 14. Fig. 19 represents a perspective view of one of the independent partitions.

The same letters of reference indicate the same parts in all the figures.

We have illustrated the application of our improvement to a fuel-economizer comprising a series of horizontal tubes or bottom headers $a$, extending across the lower portion of the flue-space in which the economizer is located, vertical tubes $a'$, rising in ranks from the headers $a$, horizontal top headers $a^2$, connected with the upper ends of the tubes $a'$, an elongated horizontal header or conduit $b$, located outside the flue-casing and connected at one end with a water-supply pipe $b'$, said header having branches $b^3$, which are connected with the bottom headers $a$, and an elevated horizontal receptacle or sectional header $c$, located above the flue-casing and connected by branches $c'$ with the top headers $a^2$ and by a delivery-pipe $c^2$, Fig. 1, with the boiler. Each bottom header, its rank of tubes, and the accompanying top header constitute a section of the economizer, the different sections being coupled together by the header $b$ and sectional header $c$, which are internally subdivided in such manner that the feed-water entering the header $b$ through the supply-pipe $b'$ flows from the said header through the first section and back to the header through the next section, and so on throughout the series of sections, the water flowing in a sinuous course through the economizer, rising through one section and descending through the next section. To effect this circulation, the header $b$ and sectional header $c$ are provided with partitions $b^4$ and $c^4$, Figs. 4, 5, and 6, which subdivide them into chambers and connect the sections of the economizer in pairs, so that when the apparatus is in operation the water entering the first chamber of the header $b$ through the supply-pipe $b'$ passes from said chamber into and through the first section of the economizer, then by way of the first chamber of the sectional header $c$ into the second section of the economizer and back through the latter to the second chamber of the header $b$, then out from said chamber to the third section of the economizer, and so on.

In carrying out our invention we provide means whereby the header $b$ may be caused to serve as an outlet for all the sections of the economizer, receiving water simultaneously from all the sections and constituting a conduit to convey waste water, steam, and sediment from the economizer. To this end we make the partitions $b^4$ in the header $b$ adjustable, so that they can be displaced from their operative position, (shown in Figs. 5 and 6,) where they are shown as connecting the sections of the economizer in pairs, and moved to the inoperative position, (shown in Figs. 7, 8, and 9,) where they are shown as located across the ends of the branches $b^3$, which normally conduct water from the header $b$ to the sections of the economizer, so that water can flow simultaneously from all the sections into the header $b$. We provide the receptacle $b$ with pockets or by-passes $b^5$, which are arranged to conduct water around the partitions $b^4$ when they are displaced, as indicated in Figs. 7 and 9. To the end of the header $b$ opposite the end connected with the supply-pipe $b'$ we connect a blow-off or waste pipe $b^6$, having a valve $b^7$, whereby it may be closed when the economizer is in operation.

It will be seen that when the partitions $b^4$ are displaced, as above indicated, and the valve $b^7$ of the blow-off pipe opened the contents of the economizer and of the header $b$ may be blown or forced off by back pressure from the boiler, each section of the economizer discharging into the header $b$, which becomes a conduit connecting all the sections with the blow-off pipe. In this way the economizer may be quickly and efficiently blown off without the removal of any of the parts of the apparatus, it being necessary only to adjust or displace the partitions $b^4$ and open the valve of the blow-off pipe.

The partitions $b^4$ may be operated by any suitable means. We have here shown them as coupled together in a series by rods $b^8$ and operated by a rod $b^9$, which is engaged with the partition at one end of the series and has a screw-threaded portion engaged with a tapped orifice in a fixed yoke $b^{10}$, Fig. 3, the rod $b^9$ passing through a stuffing-box $b^{12}$ and provided with a hand-wheel $b^{13}$. The rotation of the rod $b^9$ causes its endwise movement with the series of partitions $b^4$. A continuous rod may be employed, on which the partitions may be adjustably secured by set-screws, so that they may be arranged at any desired distance apart, or they may be connected by a chain moved by any suitable means. The partitions may be arranged to connect the sections of the economizer in multiple, two or more adjacent sections conducting water from the receptacle $b$ and a like number of adjacent sections returning water to said header. Any other suitable means may be used for adjusting the partitions $b^4$.

The header $b$, adapted, as described, to serve either as a circulation or as a blow-off conduit, may be termed an "adjustable circulation-header." It is obvious that the use of this adjustable header is not confined to the location here shown with relation to the other parts of the apparatus. A header of this character may, if desired, be substituted for the chambered header $c$, which delivers the feed-water to the boiler supply-pipe and may be used conjointly with a similar header connected with the economizer supply-pipe $b'$ or independently thereof, the supply-pipe $b'$ being connected with a non-adjustable header of any suitable construction. The bottom headers $a$ of the economizer-sections may also be of this adjustable character, as shown in Fig. 11, in economizers designed for a sinuous flow of water through each section, the adjustable partitions (here lettered $b^{15}$) being adjusted to connect the vertical pipes $a'$ in pairs with the header $a$ when the apparatus is in operation, so that water will rise from the header through one pair of pipes $a'$ and return to it through the next when the apparatus is in operation, and will flow into the header $a$ through all the vertical pipes $a'$ when the partitions are displaced.

To prevent the accumulation of air in the chambers of the sectional top header $c$ and the obstruction of the circulation liable to result therefrom, we provide air-ducts $c^5$ in the upper portions of the partitions $c^4$ in said header, as shown in Fig. 4, said ducts permitting the escape of air from each chamber to the next, so that the chambers cannot become air-bound.

A modification of the construction last described is shown in Fig. 12, in which the top headers $a^2$ are connected by return-bends $c^6$, the upper portions of which are connected by air-tubes $c^7$, each return-bend constituting an equivalent of one of the chambers of the header $c$, while the tubes $c^7$ constitute equivalents of the ducts $c^5$.

An adjustable circulation-header of the character described may be constructed to be connected with the sections of an economizer outside the walls of the flue-casing by providing it with short branches $b^{16}$, Fig. 10, having flanges or other means whereby they may be detachably connected with the outer ends of the bottom headers $a$ of the sections of the economizer outside the flue-casing, said headers being extended through the wall of the casing.

It is desirable that the adjustable portions have an easy sliding fit in the casing in which they are contained, so that they may be easily adjusted.

Another modification of the air-venting arrangement is shown in Fig. 13, in which the sections of the top header $c$ are connected by air-pipes $c^8 c^9$, the pipes $c^8$ being screwed into the header and communicating with the sections thereof, while the pipes $c^9$ connect the series of pipes $c^8$, so that air can escape from each section to the next.

In Figs. 14 to 19, inclusive, we show the partitions in the header or conduit $b$ independently adjustable, instead of being connected in a series for simultaneous adjustment. The said partitions are designated $b^{40}$ and each, as here shown, is provided with trunnions $b^{41} b^{42}$, which are fitted to turn in bearings in the header $b$, each being substantially like a stovepipe-damper. One of the trunnions is extended through the wall of the header, so that it may be turned by a crank or wrench. The header is provided with side openings to receive the partitions $b^{40}$ and with detachable covers $b^{43}$ for said openings, so that the said partitions can be conveniently inserted and removed. When the partitions $b^{40}$ are turned at right angles with the conduit, as shown in Figs. 14, 15, and 18, the water circulates through the apparatus; but when they are turned as shown in Figs. 16 and 17 the apparatus becomes non-circulating. These independent partitions may be used in any location or part of the apparatus where and adjustable circulation-header is required.

We claim—

1. An apparatus of the character specified, comprising a plurality of sections adapted for the sinuous circulation of feed-water, a header or conduit having water-circulating branches connected with said sections, and adjustable partitions in said header, whereby the apparatus may be made non-circulating.

2. An apparatus of the character specified, comprising a plurality of sections adapted for the sinuous circulation of feed-water, a header or conduit having water-circulating branches connected with said sections, adjustable partitions in said header, whereby the apparatus may be made non-circulating, and a blow-off cock at the outlet of said header.

3. An apparatus of the character specified, comprising a plurality of sections adapted for the sinuous circulation of feed-water, a header or conduit having water-circulating branches connected with said sections and having a plurality of pockets or by-passes, and a plurality of adjustable partitions in said header, whereby the apparatus may be made non-circulating.

4. An apparatus of the character specified, comprising a plurality of sections adapted for the sinuous circulation of feed-water, a header forming a part of the water-circulating system and provided with a plurality of branches connected with said sections, a series of adjustable partitions in said header, and means for simultaneously adjusting said partitions.

5. In an apparatus of the character specified, adapted for the sinuous circulation of feed-water, an outlet-header connected with a boiler, a series of circulating branches connected with the outlet-header, and a supply-header leading from the main water-supply, said supply-header being provided with a series of adjustable partitions, and with a blow-off cock, whereby the apparatus may be made non-circulating for the blowing off of sediment from the branches and the headers.

6. In an apparatus of the character specified, adapted for the sinuous circulation of feed-water, an outlet-header connected with a boiler, a supply-header leading from the main water-supply, a series of circulating branches connecting said headers, said supply-header having pockets or by-passes, and adjustable partitions whereby the apparatus may be made non-circulating.

7. In an apparatus of the character specified, adapted for the sinuous circulation of feed-water, an outlet-header connected with a boiler, a supply-header, and a series of branches connecting the two headers, one of said headers being provided with a series of adjustable partitions and means for simultaneously adjusting all of said partitions.

In testimony whereof the said RONEY has signed his name to this specification, in the presence of two subscribing witnesses, on the 14th day of April, A. D. 1896, and the said CHURCHILL on the 17th day of April, in the same year.

WILLIAM R. RONEY.
W. W. CHURCHILL.

Witnesses to W. R. R.:
C. F. BROWN,
E. BATCHELDER.

Witnesses to W. W. C.:
HENRY L. KENT,
A. DE LA M. LOZIER.